J. A. BOWLUS.
Evaporating Pan.

No. 38,278.  Patented Apr. 28, 1863.

Witnesses:

Inventor:

UNITED STATES PATENT OFFICE.

J. A. BOWLUS, OF FREMONT, OHIO.

IMPROVEMENT IN SUGAR-EVAPORATORS.

Specification forming part of Letters Patent No. 38,278, dated April 28, 1863.

*To all whom it may concern:*

Be it known that I, J. A. BOWLUS, of Fremont, in the county of Sandusky and State of Ohio, have invented a new and Improved Sugar-Pan; and I do hereby declare that the following is a full, clear, and exact description of the same, reference being had to the accompanying drawings, forming a part of this specification, in which—

Figure 1:
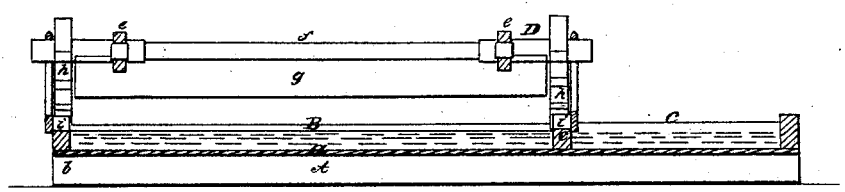
Figure 2:
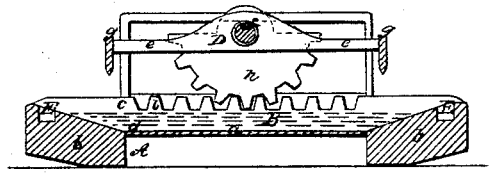
Figure 3:
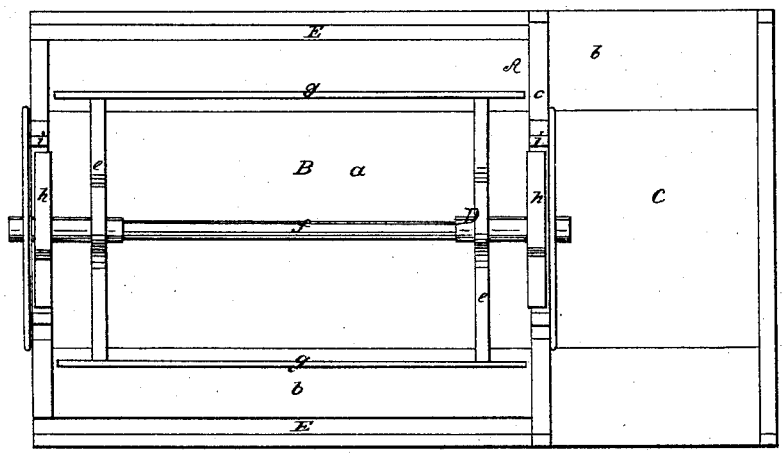

Figure 1 represents a longitudinal vertical section of my invention. Fig. 2 is a transverse vertical section of the same. Fig. 3 is a plan or top view of the same.

Similar letters of reference indicate corresponding parts in the three views.

This invention consists in the arrangement of oscillating slotted arms projecting on opposite sides from a shaft which has its bearings in toothed segments rolling on correspondingly-toothed racks, in combination with a pan having inclined sides, and provided with side channels to receive the scum in such a manner that by means of the slats on the ends of said oscillating arms the scum, which naturally settles down upon the inclined sides as soon as the boiling commences, can be removed and pushed into the side channels, through which it is conducted to suitable barrels or vessels, and that one operator is enabled to remove the scum from both sides of the pan without changing his position or walking from one side of the pan to the other.

To enable those skilled in the art to make and use my invention, I will proceed to describe it with reference to the drawings.

The pan A is made with a flat metal bottom, *a*, and with inclined sides *b*, of wood or any other bad conductor of heat. It is divided into two compartments, B C, one being intended to boil the juices and defecate the same, and the other to finish the sirup. The partition *c*, which separates the two compartments, is provided with a gap, *d*, Fig. 2, on one side, which forms the communication between the two compartments, and admits the juice from one to the other. A suitable gate may be arranged to close this gap, and the compartments B C may be further subdivided by a series of transverse partitions, each with a small gap at opposite sides to let the juice pass through, and provided with suitable gates to enable the operator to detain the juices in either compartment as long as he thinks necessary.

D is the skimmer, which consists of two arms, *e*, which oscillate on a shaft, *f*, and which are connected on both sides of said shaft by slats *g*, running parallel with the sides of the pan. The shaft *f* has its bearings in toothed segments *h*, which roll on correspondingly-toothed racks *i*, one rack being formed on the edge of the end piece of the pan, and the other on the edge of the partition *e*, which separates the two main compartments B C. E are channels which are cut into the sides of the pan, and which extend from the partition *e* to the end, being slightly inclined, so that the scum deposited in the same will readily flow toward the end of the pan. When the juice in the pan begins to boil, the impurities and scum descend to the inclined sides, and are deposited on the same just at the edge of the boiling-surface. The operator then takes hold of one of the slats *g* of the skimmer, lowers said slat just back of the scum deposited on the side, and by drawing the slat in the proper direction removes all the scum into the side channels. By raising one slat the slat on the opposite side is depressed, and by reversing the motion of the skimmer the operator is enabled to push the scum on the opposite side of the pan into the side channel on that side, and through these channels the scum runs down into the barrels or other vessels intended to receive the same. The operator is thus enabled to clean the pan by two motions on both sides, from end to end, without disturbing the boiling of the juice, or taxing the heat to do part of its work over again, as is the case in skimming under the old way. Furthermore, the whole operation of skimming can be performed by one operator without leaving his place or walking from one side of the pan to the other, thus saving much time, and rendering the operation of skimming less laborious and much easier to perform than with the skimmers of the ordinary construction.

What I claim as new, and desire to secure by Letters Patent, is—

1. The arrangement of oscillating arms *e*, with slats $g$, in combination with the shaft $f$, toothed segments $h$, and racks $i$, and with inclined sides $b$ of the pan A, constructed and operating in the manner and for the purpose substantially as specified.

2. The arrangement of the side channels, E, in combination with the skimmers D and pan A, as and for the purpose shown and described.

J. A. BOWLUS.

Witnesses:
W. H. BOWLUS,
JOHN W. HYATT.